United States Patent
Elgimiabi et al.

(10) Patent No.: US 12,486,437 B2
(45) Date of Patent: Dec. 2, 2025

(54) SHIMMING ADHESIVE

(71) Applicant: 3M INNOVATIVE PROPERTIES COMPANY, St. Paul, MN (US)

(72) Inventors: Sohaib Elgimiabi, Dusseldorf (DE); Stefan Spiekermann, Neuss (DE); Lianzhou Chen, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 734 days.

(21) Appl. No.: 17/781,189

(22) PCT Filed: Dec. 11, 2020

(86) PCT No.: PCT/IB2020/061832
§ 371 (c)(1),
(2) Date: May 31, 2022

(87) PCT Pub. No.: WO2021/124049
PCT Pub. Date: Jun. 24, 2021

(65) Prior Publication Data
US 2023/0002652 A1 Jan. 5, 2023

Related U.S. Application Data

(60) Provisional application No. 62/950,437, filed on Dec. 19, 2019.

(51) Int. Cl.
*C09J 163/00* (2006.01)
*C08G 59/38* (2006.01)
*C08G 59/50* (2006.01)

(52) U.S. Cl.
CPC .................................. *C09J 163/00* (2013.01)

(58) Field of Classification Search
None
See application file for complete search history.

(56) References Cited

U.S. PATENT DOCUMENTS

| | | | |
|---|---|---|---|
| 8,491,749 B2 * | 7/2013 | Gorodisher | C08L 63/00 525/107 |
| 2011/0244245 A1 | 10/2011 | Elgimiabi | |
| 2012/0285342 A1 | 11/2012 | Adelman et al. | |
| 2016/0152879 A1 | 6/2016 | Elgimiabi et al. | |
| 2018/0030319 A1 * | 2/2018 | Chen | C09J 163/00 |
| 2019/0382634 A1 | 12/2019 | Elgimiabi | |

FOREIGN PATENT DOCUMENTS

| WO | 2010091072 A1 | 8/2010 |
|---|---|---|
| WO | 2010091395 A1 | 8/2010 |
| WO | 2014210298 A1 | 12/2014 |
| WO | 2016137671 A1 | 9/2016 |
| WO | 2019005800 A1 | 1/2019 |
| WO | 2019036211 A1 | 2/2019 |
| WO | 2019078044 | 4/2019 |

OTHER PUBLICATIONS

International Search Report for PCT International Application No. PCT/IB2020/058886, mailed on Dec. 10, 2019, 3 pages.

* cited by examiner

*Primary Examiner* — Michael J Feely
(74) *Attorney, Agent, or Firm* — Philip P. Soo

(57) ABSTRACT

Provided are two-part shimming adhesives comprising a base part and a hardener part that are curable upon mixing. The base part includes a multifunctional epoxy resin having an epoxide functionality of at least three, a difunctional epoxy resin miscibly blended with the multifunctional epoxy resin. The hardener part includes a polyetheramine. Either the base part or hardener part further comprises an inorganic filler present in an amount from 10 percent to 60 percent, relative to the overall weight of the two-part curable shimming adhesive, and a phosphoric acid ester. The shimming adhesive enables joints to be assembled in one step, providing a significant advantage to the user.

8 Claims, No Drawings

SHIMMING ADHESIVE

CROSS REFERENCE TO RELATED APPLICATIONS

This application is a national stage filing under 35 U.S.C. 371 of PCT/IB2020/061832, filed Dec. 11, 2020, which claims the benefit of U.S. Provisional Patent Application No. 62/950,437, filed Dec. 19, 2019, the disclosure of which is incorporated by reference in its/their entirety herein.

FIELD OF THE INVENTION

Provided herein are curable adhesives for shimming bonded structures, such as primary and secondary structures in industrial applications.

BACKGROUND

A shim is a thin piece of material used to fill small gaps or spaces between parts to be joined together. Shims assume the shape of the gap and can support a compressive load to prevent undue distortion and damage to structural parts when fastened together, typically using mechanical fasteners. Shims are used in industrial applications, such as in automotive and aerospace manufacturing. Various forms of shims are also used in residential and commercial construction.

Various types of shims are available. Solid shims may be made of the same material as the interfacing parts. Laminated peelable shims may be made of foil layers that can be removed one-by-one until a favorable fit is achieved. Liquid shim materials work well in filling irregular or tapered interfaces and are typically used to fill gaps less than 0.7 millimeters in width.

Determining the necessity, size, and shape of a given shim is often an iterative and labor-intensive process. Generally, parts are temporarily assembled and then visually inspected and measured for gaps between the skin and substructure. The parts may then be dismantled and a trial shim would be fabricated. The parts may then be reassembled with the shim temporarily secured in place, to check the fit. This is a second temporary assembly operation and such operations may need to be repeated until a proper fit is achieved.

Liquid shims are not structural adhesives, as the bondline does not reside in the primary load path. In mechanically-fastened joints, shear load is borne by the fastener and not the shimming material. In these assemblies, the only loads borne by the liquid shim are compressive loads.

SUMMARY

Provided herein is a liquid shimming composition that can also function as an adhesive. When cured, this shimming composition provides high peel strength, along with excellent hot/wet bond performance, and enables simplification of the manufacturing process by eliminating the need to apply a separate adhesive.

In a first aspect, a two-part curable shimming adhesive is provided. The adhesive comprises: a base part comprising: a multifunctional epoxy resin having an epoxide functionality of at least three; and a difunctional epoxy resin miscibly blended with the multifunctional epoxy resin; and a hardener part comprising a polyetheramine; wherein either the base part or hardener part further comprises an inorganic filler present in an amount from 10 percent to 60 percent, relative to the overall weight of the two-part curable shimming adhesive, and a phosphoric acid ester.

Definitions

As used herein:

"alkyl" refers to straight chain and branched alkyl groups and cycloalkyl groups having from 1 to 40 carbon atoms, 1 to 20 carbon atoms, 1 to 12 carbons or, in some embodiments, from 1 to 8 carbon atoms;

"ambient conditions" means at a temperature of 23° C. and a pressure of 1 atmosphere (i.e., 101.3 kPa);

"ambient temperature" refers to a temperature of 23° C.;

"average" refers to a number average unless otherwise specified;

"cure" refers to chemically crosslinking, such as by exposing to radiation in any form, heating, or allowing to undergo a chemical reaction that results in hardening or an increase in viscosity (e.g., under ambient temperature or heated conditions);

"cycloalkyl" refers to cyclic alkyl groups such as, but not limited to, cyclopropyl, cyclobutyl, cyclopentyl, cyclohexyl, cycloheptyl, and cyclooctyl groups;

"organic group" refers to any carbon-containing functional group;

"polymeric" refers to a molecule having a plurality of repeating units;

"substantially" means a majority of, or mostly, as in at least 50%, 60%, 70%, 80%, 90%, 95%, 96%, 97%, 98%, 99%, 99.5%, 99.9%, 99.99%, or at least 99.999% or more, or 100%; and "substituted" in conjunction with a molecule or an organic group as defined herein refers to the state in which one or more hydrogen atoms contained therein are replaced by one or more non-hydrogen atoms.

DETAILED DESCRIPTION

As used herein, the terms "preferred" and "preferably" refer to embodiments described herein that can afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the invention.

As used herein and in the appended claims, the singular forms "a," "an," and "the" include plural referents unless the context clearly dictates otherwise. Thus, for example, reference to "a" or "the" component may include one or more of the components and equivalents thereof known to those skilled in the art. Further, the term "and/or" means one or all of the listed elements or a combination of any two or more of the listed elements.

In methods described herein, steps can be carried out in any order without departing from the principles of the disclosure, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

It is noted that the term "comprises," and variations thereof, do not have a limiting meaning where these terms appear in the accompanying description. Moreover, "a,"

"an," "the," "at least one," and "one or more" are used interchangeably herein. Relative terms such as left, right, forward, rearward, top, bottom, side, upper, lower, horizontal, and vertical may be used herein and, if so, are from the perspective observed in the particular FIGURE. These terms are used only to simplify the description, however, and not to limit the scope of the invention in any way.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention.

Provided herein are curable two-part compositions used to make shims for bonded assemblies. The bonded assemblies, in some instances, may be used in automotive, aerospace, marine, residential, architectural or other commercial or industrial applications.

In some embodiments, the shimmed parts are aircraft components. Aircraft components include the skin and substructure of the aircraft. Aircraft substructures are not particularly limited and can include, for example, springers, spars, ribs, and other framing elements in the aircraft's wings and fuselage.

Structural shims are fly-away components of the aircraft and are made from stiff, load-bearing materials. These shims are used to fill gaps between assembled parts that would otherwise produce dimpling or buckling of the part, and associated stress concentrations. These stress concentrations, if severe, can cause fasteners to fail and ultimately cause significant damage to the aircraft. Accordingly, it is desirable to provide compositions that can readily flow or spread (i.e., a liquid or paste) before curing, allowing it to form a customized shim that precisely fits the gap in which it is to be installed.

The provided curable shimming adhesive is preferably a two-part composition that includes a base part and a curative part. The curable adhesive can be cured by mixing the base part and curative part together. For convenience to the user, curing generally takes place at ambient temperature.

Base Part

The base part of the curable two-part shimming adhesive is comprised of a blend of epoxy resins. More particularly, the blend includes a difunctional epoxy resin and a multifunctional epoxy resin having an epoxide functionality of at least two and preferably three or more.

The difunctional epoxy resin has an epoxide functionality of exactly two, and can be miscibly blended with the multifunctional epoxy resin. The multifunctional epoxy resin can have an epoxide functionality of at least 2.1, at least 2.2, at least 2.3, at least 2.4, at least 2.5, at least 2.6, at least 2.7, at least 2.8, at least 2.9, or at least 3. The multifunctional epoxy resin may also be comprised of two or more resins having respective epoxide functionalities greater than two.

Epoxy resins include glycidated resins, cycloaliphatic resins, and epoxidized oils. The glycidated resins can be the reaction product of a glycidyl ether, such as epichlorohydrin, and a bisphenol compound such as bisphenol A. Various examples of epoxy resins include C4-C28 alkyl glycidyl ethers; C2-C28 alkyl- and alkenyl-glycidyl esters; C1-C28 alkyl-, mono- and poly-phenol glycidyl ethers; polyglycidyl ethers of pyrocatechol, resorcinol, hydroquinone, 4,4'-dihydroxydiphenyl methane (or bisphenol F), 4,4'-dihydroxy-3,3'-dimethyldiphenyl methane, 4,4'-dihydroxydiphenyl dimethyl methane (or bisphenol A), 4,4'-dihydroxydiphenyl methyl methane, 4,4'-dihydroxydiphenyl cyclohexane, 4,4'-dihydroxy-3,3'-dimethyldiphenyl propane, 4,4'-dihydroxydiphenyl sulfone, and tris (4-hydroxyphynyl)methane; polyglycidyl ethers of the chlorination and bromination products of the above-mentioned diphenols; polyglycidyl ethers of novolacs; polyglycidyl ethers of diphenols obtained by esterifying ethers of diphenols obtained by esterifying salts of an aromatic hydrocarboxylic acid with a dihaloalkane or dihalogen dialkyl ether; polyglycidyl ethers of polyphenols obtained by condensing phenols and long-chain halogen paraffins containing at least two halogen atoms; N,N'-diglycidyl-aniline; N,N'-dimethyl-N,N'-diglycidyl-4,4'-diaminodiphenyl methane; N,N,N',N'-tetraglycidyl-4,4'-diaminodiphenyl methane; N,N'-diglycidyl-4-aminophenyl glycidyl ether; N,N,N',N'-tetraglycidyl-1,3-propylene bis-4-aminobenzoate; phenol novolac epoxy resin; cresol novolac epoxy resin; and combinations thereof.

Representative non-limiting examples of suitable epoxy resins include bis-4,4'-(1-methylethylidene) phenol diglycidyl ether and (chloromethyl) epoxide bisphenol A diglycidyl ether. Commercially available epoxy resins that can be used in the practice of this invention include those sold under the trade designation ARALDITE by Huntsman Corporation, The Woodlands, TX and EPON by Hexion Inc., Columbus, OH. Suitable epoxy resins also include glycidyl ethers of trihydric phenols such as tris(hydroxyphenyl) methane. Such resins are commercially available under the trade designation TACTIX by Huntsman Corporation, The Woodlands, TX.

In some embodiments, an epoxy novolac resin may be used. In some embodiments, the multifunctional epoxy resins include a tetrafunctional epoxy resin based on meta-xylenediamine, such as those sold under the trade designation ERISYS by Emerald Performance Materials LLC, Vancouver, WA.

It can be advantageous to use a mixture of epoxy resins whose constituents are selected to provide the desired viscosity characteristics before curing. In some embodiments, the multifunctional epoxy resin includes a trifunctional epoxy resin, such as triphenyl methane triglycidyl ether, or other glycidyl ether with three or more epoxide groups per molecule. The trifunctional epoxy resin is, in some instances, a solid epoxy resin at ambient temperature. Optionally the trifunctional epoxy resin is blended with a tetrafunctional epoxy resin, such as 4,4'-methylenebis(N,N-diglycidylaniline). The difunctional epoxy resin can be a bisphenol A/epichlorohydrin derived liquid epoxy resin, or other glycidyl ether with two epoxide groups per molecule.

The relative amounts of multifunctional epoxy resin and the difunctional epoxy resin can be adjusted to obtain suitable crosslink density, which in turn affects important adhesive properties such as glass transition temperature, tensile strength, and shear strength. Low viscosity difunctional epoxy resins in suitable amounts can also help the uncured adhesive flow and wet the bonding surfaces of a substrate for improved bond strength. In the provided shimming adhesives, the multifunctional epoxy resin and the difunctional epoxy resin can be present in a relative weight ratio of from 1:1 to 6:1, from 1:1 to 4:1, from 1:1 to 2:1, or in some embodiments, less than, equal to, or greater than 1:1, 2:1, 3:1, 4:1, 5:1, or 6:1, relative to each other.

In a preferred embodiment, the multifunctional epoxy resin includes both a trifunctional epoxy resin and tetrafunctional epoxy resin in relative amounts that balance the competing properties of stiffness and adhesiveness in the cured shimming adhesive. It was discovered that certain epoxy resins, such as solid or semi-solid triphenyl methane triglycidyl ethers, were found to increase adhesive stiffness, while others such as the liquid tetrafunctional 4,4'-methylenebis(N,N-diglycidylaniline) were found to enhance adhesive strength.

In keeping with these considerations, the trifunctional epoxy resin and the tetrafunctional epoxy resin can be present in a relative weight ratio of from 1:1 to 8:1, from 1:1 to 6:1, from 1:1 to 4:1, or in some embodiments, less than, equal to, or greater than 1:1, 2:1, 3:1, 4:1, 5:1, 6:1, 7:1, or 8:1, relative to each other.

The epoxy resin or resins in the base part can have any suitable molecular weight. The weight average molecular weight can be from 100 g/mol to 50,000 g/mol, from 175 g/mol to 20,000 g/mol, from 250 g/mol to 10,000 g/mol, or in some embodiments less than, equal to, or greater than 100 g/mol; 125; 150; 175; 200; 250; 300; 350; 400; 450; 500; 550; 600; 650; 700; 750; 800; 850; 900; 950; 1000; 2000; 5000; 7000; 10,000; 20,000; 30,000; 40,000; or 50,000 g/mol.

The total mixture of the base part and curative part generally includes at least 20 weight percent epoxy resin based on a combined weight of the base part and the hardener part (i.e., based on a total weight of the shimming adhesive composition). For example, the shimming adhesive can include at least 25 weight percent, at least 30 weight percent, at least 40 weight percent, or at least 50 weight percent epoxy resin. The shimming adhesive can include up to 90 weight percent epoxy resin.

In some embodiments, the base part further includes an inorganic filler to enhance the compressive strength of the cured shimming adhesive. Many useful inorganic fillers are possible. Examples include naturally occurring or synthetic materials such as silicon dioxide; nitrides (e.g., silicon nitride); glasses and fillers derived from, for example, Zr, Sr, Ce, Sb, Sn, Ba, Zn, and Al; feldspar; borosilicate glass; zirconia; titania; and micrometer and sub-micrometer fumed silica particles (e.g., pyrogenic silicas such as those available under the trade designations AEROSIL, including "OX 50," "130," "150" and "200" silicas from Degussa Corp., Akron, Ohio and CAB-O-OSIL M5 silica from Cabot Corp., Tuscola, IL). In a preferred embodiment, the inorganic filler includes fumed silica. The fumed silica optionally has a median particle size in the range of from 1 to 10 micrometers.

The inorganic filler or fillers can be present in any suitable amount. The filler can be from 10 percent to 60 percent, from 12 percent to 45 percent, from 15 percent to 30 percent, or in some embodiments, less than, equal to, or greater than 10 percent, 12, 15, 17, 20, 25, 30, 35, 40, 45, 50, 55, or 60 percent, relative to the overall weight of the two-part curable shimming adhesive.

To facilitate dispersion of the inorganic filler in the matrix resins, the base part can further include a phosphoric acid ester. The phosphoric acid ester can be, in some cases, a phosphoric acid polyester copolymer containing acid groups. Useful phosphoric acid esters are available under the trade designation BYK W 9010, by Altana AG, Wesel, Germany.

The inorganic filler and phosphoric acid ester can be present in a relative weight ratio of from 100:3 to 1000:3, 100:3 to 500:3, from 100:3 to 300:3, or in some embodiments, less than, equal to, or greater than 100:3, 150:3, 200:3, 250:3, 300:3, 350:3, 400:3, 450:3, 500:3, 600:3, 700:3, 800:3, 900:3, or 1000:3.

The base part can, in some embodiments, include other toughening components. Exemplary toughening components can include, for example, core-shell rubber particles.

Core-shell particles are filler particles having two or more distinct concentric parts: a core and at one or more shell layers surrounding the core. In some embodiments, the core-shell particle is a core-shell rubber (CSR) particle having an elastomeric core and made from either a physically crosslinked or microphase-separated polymer, while the shell layer is made from a non-elastomeric glassy polymer. Advantageously, the rubbery, elastomeric core can enhance toughness in the cured shimming adhesive, while the glassy polymeric shell can provide compatibility between the filler particle and the matrix.

In exemplary composite applications, the core-shell particles can have a particle diameter in the range of from 10 nm to 800 nm, from 50 nm to 500 nm, or from 80 nm to 300 nm, or in some embodiments, less than, equal to, or greater than 5 nm, 10, 20, 30, 40, 50, 70, 100, 200, 300, 400, 500, 600, 700, 800, 900, or 1000 nm.

The core-shell particles may be uniformly dispersed in the composition, or at least partially aggregated. Aggregated core-shell particles may be in physical contact with one or more other core-shell particles. In some embodiments, the core-shell particles form long chains of aggregated particles that extend across the bulk of the curable resin. Such aggregated core-shell particle chains may be linear or branched. The core-shell particle chains may themselves be uniformly distributed throughout the bulk of the curable resin. The configuration of such aggregates can be substantially preserved when the shimming adhesive is cured.

The core-shell rubber toughener can present in an amount of from 1 percent to 20 percent, from 1 percent to 15 percent, from 1 percent to 10 percent, or in some embodiments, less than, equal to, or greater than 1 percent, 2, 3, 4, 5, 6, 7, 8, 9, 10, 11, 12, 13, 14, 15, 16, 17, 18, 19, or 20 percent of the overall weight of the base part of the two-part curable shimming adhesive.

Further technical aspects of core-shell particles are described elsewhere, such as in co-pending International Publication No. WO 2019/005800 (Chen et al.).

The base part optionally contains one or more reactive diluents. Reactive diluents, which lower the viscosity of the epoxy resin components, are generally epoxy resins having either a branched aliphatic backbone that is saturated or a cyclic backbone. Examples of reactive diluents include, but are not limited to, the diglycidyl ether of resorcinol, the diglycidyl ether of cyclohexane dimethanol, the diglycidyl ether of neopentyl glycol, and the triglycidyl ether of trimethylolpropane. Diglycidyl ethers of cyclohexane dimethanol are commercially available under the trade designation HELOXY MODIFIER 107 from Hexion Specialty Chemicals in Columbus, OH and under the trade designation EPODIL 757 from Evonik Industries AG, Essen, Germany.

Reactive diluents may be added in suitable amounts to obtain a desired viscosity profile for the uncured shimming adhesive. Typical amounts can be from 1 percent to 12 percent by weight based on the total weight of the epoxy component. Further details of reactive diluents can be found in, for example, International Publication No. WO 2014/210298 (Elgimiabi et al.).

Hardener Part

The hardener part includes at least one curative that, when mixed with the epoxy resins in the base part, produces a chemical reaction by which the two-part shimming adhesive is cured.

Useful curatives include cyclic compounds that contain at least one cyclic moiety, which may either be an aliphatic or aromatic. The cyclic moiety may be substituted by primary amino groups, i.e. the primary amino groups may be bonded directly to the ring. Preferably, the cyclic moiety is substituted by one or more residues carrying the primary amino group, optionally at a terminal position. That residue may be, for example, a linear or branched aminoalkyl group, preferably with the primary amino group at the terminal position.

The curative can contain at least one, preferably at least two primary amino groups (—NH$_2$ groups) at a terminal position. Most preferred embodiments contain two primary amino groups and both are at the terminal position of the molecule. The at least one cyclic moiety is typically a five- or six-membered ring, which may be a hydrocarbon or a heterohydrocarbon ring. The heterohydrocarbon ring typically contains one, or more than one, heteroatom selected from nitrogen and oxygen atoms.

Examples of suitable curatives include but are not limited to cyclohexanes containing one or more terminal primary amino groups and/or aminoalkyl residues with one or more terminal primary amino groups, piperazines containing one or more terminal primary amino groups and/or aminoalkyl residues with one or more terminal primary amino groups, and morpholines containing one or more terminal primary amino and/or aminoalkyl groups with terminal primary amino groups. Particular examples include but are not limited to bis or tris aminoalkyl piperazines or morpholines. Specific examples include, but are not limited to, 1-amino-3-aminomethyl-3,5,5-trimethylcyclohexane (also called isophorone diamine) and N,N-bis(3 aminopropyl) piperazine.

The curatives may be aliphatic cyclic (poly)amines as described above or they may be adducts of such aliphatic cyclic polyamines with one or more epoxy resins, with the proviso that the aliphatic cyclic polyamines are used in molar excess to ensure the adducts contain at least two primary amine groups, preferably at a terminal position of the adduct. Preferably, the epoxy resin used to form the adduct is the same or a similar one to one of the epoxy resins used in the epoxy component. For example, the first curative is a diamine and is reacted with an epoxy resin having two glycidyl groups to form an adduct, the first primary curative may be used in a molar ratio of diamine to epoxy resin greater than or equal to 2:1 to form an amine-containing adduct having two amino groups. A molar excess of the amine is often used so that the curative includes both the amine-containing adduct plus free (non-reacted) amine curative. For example, the molar ratio of the amine curative to epoxy resin with two glycidyl groups can be greater than 2.5:1, greater than 3:1, greater than 3.5:1, or greater than 4:1.

Useful aliphatic amines need not be cyclic and can include linear and/or branched polyetheramines. In some embodiments the curative composition comprises at least one adduct of an excess of a difunctional unbranched polyetheramine with an epoxy resin, typically a molar excess of from 200% to 800%, from 300% to 600%, from 400% to 500%, or in some embodiments, less than, equal to, or greater than 200%, 250, 300, 350, 400, 450, 500, 550, 600, 650, 700, 750, or 800%.

The unbranched polyetheramine can have a molecular weight of from 130 g/mol to 500 g/mol, from 180 g/mol to 400 g/mol, from 200 g/mol to 300 g/mol, or in some embodiments, less than, equal to, or greater than 130 g/mol, 140, 150, 160, 170, 180, 190, 200, 220, 250, 270, 300, 320, 350, 370, 400, 420, 450, 470, or 500 g/mol.

The unbranched polyetheramine can have between one and four ether oxygens and more typically two or three ether oxygens. In some embodiments the unbranched polyetheramine may be a compound according to Formula I:

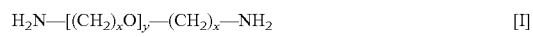

$$H_2N-[(CH_2)_xO]_y-(CH_2)_x-NH_2 \qquad [I]$$

wherein y is selected from 1, 2, 3 or 4, and wherein each x is independently selected from 2, 3, or 4.

In some embodiments the unbranched polyetheramine may be 4,7,10-trioxa tridecane 1,13-diamine (TTD). In some embodiments the unbranched polyetheramine may be 4,7-dioxadecane 1,10-diamine, commercially available as JEFFAMINE EDR 176.

Suitable amounts of the polyetheramine can be from 5 percent to 30 percent, from 5 percent to 20 percent, from 5 percent to 15 percent, or in some embodiments, less than, equal to, or greater than 5 percent, 10, 15, 20, 25, or 30 percent, relative to the overall weight of the shimming adhesive prior to curing.

In some instances, the hardener part further includes a secondary curative. Secondary curatives can be imidazoles or salts thereof, imidazolines or salts thereof, or phenols substituted with tertiary amino groups. An exemplary secondary curative is tris-2,4,6-(dimethylaminomethyl)phenol that is commercially available under the trade designation ANCAMINE K54 from Evonik Industries AG, Essen, Germany.

Any of the components that can be present in the base part of the two-part curable shimming adhesive could also be present in the hardener part. For example, the hardener part can contain any of the inorganic fillers, such as fumed silica, described in reference to the base part in the amounts provided earlier. The hardener part can also contain any of the phosphoric acid esters used in combination with the inorganic fillers as described in reference to the base part in the amounts provided earlier. The hardener part can also contain any of the core-shell rubber tougheners described in reference to the base part in the amounts provided earlier.

In any of the cases above, both of the base part and hardener part may contain the aforementioned components, in similar or dissimilar proportions.

Either or both of the base and hardener parts may additionally comprise additives including impact modifiers, other functional fillers, rheology modifiers and/or pigments known to those of skill in the art.

Methods of Shimming

Prior to use, the base part and hardener part are kept separated from each other to avoid premature curing. At time of use, these parts are mixed to provide a homogeneous, reactive mixture. The amount of each part included in the mixture can be selected to provide the desired molar ratio of epoxide groups from the base part to amine hydrogen atoms from the hardener part. The ratio of amine hydrogen equivalent weight of the curative(s) to epoxy equivalent weight can be selected such that sufficient amine groups are present to fully react with the epoxide groups in the epoxy resins, and any other reactive diluents or additives, if present.

The shimming adhesive, now mixed, can then be disposed between the bonding surfaces of two or more respective substrates and then allowed to cure, thereby providing a bonded assembly. In a preferred method of bonding, two substrates are mated with each other with the reactive mixture disposed therebetween, and the two substrates further secured to each other using a mechanical fastener that extends through the substrates and reactive mixture while it is in the process of curing. The provided compositions can be especially suitable as shim materials, in particular for filling residual gaps between components of an assembly, while simultaneously acting as an adhesive capable of supporting a tensile, shear, and peel loads.

In many embodiments the shimming adhesive compositions will have a low viscosity at ambient temperature, enabling it to be injected or otherwise applied by syringe. Typically, the compositions show a low degree of sag or creep upon application.

In many embodiments the shimming adhesive compositions provided herein will cure fully at ambient temperature in 24 to 48 hours and can be sanded or drilled four hours after application. In many embodiments the shimming adhesive compositions will have a pot life (time for positioning and adjusting) of approximately 3 hours and may be cured at an accelerated rate with application of mild heat, typically curing in less than 30 minutes at 70° C.

The cured compositions show good mechanical properties that are desirable for shimming applications, and in particular for shimming applications in the automotive and aircraft industry. For example, the cured shim compositions may have a cohesive strength, as measured by overlap shear strength, of at least 2500 psi (17.2 MPa). For example, overlap shear strength can be at least 3000 psi (20.7 MPa) or at least 3200 psi (22.1 MPa).

Substrate materials can include metals (e.g., steel, iron, copper, aluminum, or alloys thereof) and composites. The composites typically contain one or more type of fibers embedded in a resin. Typical fibers include carbon fibers, glass fibers and combination thereof. The resin may be an epoxy resin, a phenolic resin, a polyamide resin or combinations thereof or other resins. Preferably, the compositions are applied to fill residual gaps between composite materials, most preferably fiber-reinforced resins, including carbon fiber and glass fiber reinforced epoxy composites.

In many embodiments the shimming adhesive compositions will demonstrate high compression strength properties at ambient temperature and elevated temperatures, along with high peel resistance at non-elevated temperatures, such as at ambient temperature. For example, the shimming adhesive when cured can have a compressive modulus of from 500 MPa to 2500 MPa, from 700 MPa to 2000 MPa, or from 700 MPa to 1500 MPa at 90° C. The same shimming adhesive when cured can have an average Floating Roller Peel Strength of from 50 N/25 mm to 250 N/25 mm, from 100 N/25 mm to 250 N/25 mm, or from 120 N/25 mm to 250 N/25 mm at ambient temperature.

The provided shimming adhesives are not limited in application to aircraft and automotive assemblies. The gaps to be shimmed could also be between assembled parts of a residential or commercial building, or components thereof. For example, the provided shimming adhesive may be used to shim gaps in components of wind energy plants or stations, for example rotor blades or towers of a wind turbine.

Further exemplary embodiments are provided below, which are not intended to be exhaustive:

1. A two-part curable shimming adhesive comprising: a base part comprising: a multifunctional epoxy resin having an epoxide functionality of at least three; and a difunctional epoxy resin miscibly blended with the multifunctional epoxy resin; and a hardener part comprising a polyetheramine; wherein either the base part or the hardener part further comprises an inorganic filler present in an amount from 10 percent to 60 percent, relative to the overall weight of the two-part curable shimming adhesive, and a phosphoric acid ester.

2. The two-part curable shimming adhesive of embodiment 1, wherein the multifunctional epoxy resin and the difunctional epoxy resin are present in a weight ratio of from 1:1 to 6:1.

3. The two-part curable shimming adhesive of embodiment 1 or 2, wherein the base part and/or the hardener part further comprises core-shell rubber particles present in an amount of from 1 percent to 20 percent, relative to the overall weight of the two-part curable shimming adhesive.

4. The two-part curable shimming adhesive of any one of embodiments 1-3, wherein the multifunctional epoxy resin comprises a trifunctional epoxy resin.

5. The two-part curable shimming adhesive of embodiment 4, wherein the trifunctional epoxy resin comprises triphenyl methane triglycidyl ether.

6. The two-part curable shimming adhesive of any one of embodiments 1-5, wherein the multifunctional epoxy resin comprises a tetrafunctional epoxy resin.

7. The two-part curable shimming adhesive of embodiment 6, wherein the tetrafunctional epoxy resin comprises 4,4'-methylenebis(N,N-diglycidylaniline).

8. The two-part curable shimming adhesive of any one of embodiments 1-7, wherein the trifunctional epoxy resin and the tetrafunctional epoxy resin are present in a relative weight ratio of from 1:1 to 8:1.

9. The two-part curable shimming adhesive of any one of embodiments 1-8, wherein the polyetheramine comprises trioxadecane diamine.

10. The two-part curable shimming adhesive of any one of embodiments 1-9, wherein the polyetheramine is present in an amount of from 5 percent to 30 percent, relative to the overall weight of the two-part curable shimming adhesive.

11. The two-part curable shimming adhesive of any one of embodiments 1-10, wherein the inorganic filler comprises fumed silica.

12. A bonded assembly comprising a reaction product of the two-part curable shimming adhesive of any one of embodiments 1-11, the reaction product disposed between bonding surfaces of two or more respective substrates.

EXAMPLES

Objects and advantages of this disclosure are further illustrated by the following non-limiting examples, but the particular materials and amounts thereof recited in these examples, as well as other conditions and details, should not be construed to unduly limit this disclosure. Unless otherwise noted, all parts, percentages, and ratios in the Examples and the rest of the specification are by weight.

TABLE 1

Materials

| Designation | Description | Source |
|---|---|---|
| 2422 | Aliphatic amine curing agent available under the designation ANCAMINE 2422 | Evonik Industries AG, Essen, Germany |
| 2650J | Low temperature impact modifier, available under the trade designation PARALOID EXL-2650J | Dow Corning, Midland, MI, United States |
| A140 | Volcanic rock available under the designation EUROCELL 140 | Europerl, St. Polten, Austria |
| ATBN | Liquid rubber amine terminated impact modifier available under the designation HYPRO 1300X16 ATBN | CVC Thermoset Specialties, Moorestown, NJ, United States |
| BAPP | 1,4-bis(3-aminopropyl)piperazine | MilliporeSigma, St. Louis, MO, United States |
| C-Yellow | Chromophthal yellow pigment | BASF Corporation, Ludwigshafen, Germany |
| D.E.N.431 | Novolac based multifunctional epoxy resin, available under the trade designation D.E.N. 431 | Olin Corporation, Clayton, MO, United States |
| E1510 | Medium viscosity epoxy resin, available under the trade designation EPONEX Resin 1510 | Hexion Specialty Chemicals, Louisville, KY, United States |
| E828 | Medium viscosity difunctional liquid epoxy resin, available under the trade designation EPOKITE Resin 828 | Hexion Specialty Chemicals |
| E757 | 1,4-Cyclohexandimethanoldiglycidylether, available under the trade designation EPODIL757 | Evonik Industries AG |
| EC130 | Polyetheramine based curing agent, available under the trade designation BAXXODUR EC 130 | BASF Corporation |
| GLYEO | Epoxy silane, available under the designation DYNASYLAN GLYEO | Evonik Industries AG |
| K54 | tris-(dimethylaminomethyl) phenol curing agent, available under the trade designation ANCAMINE K54 | Evonik Industries AG |
| Blue | Blue pigment, available under the trade designation KEYPLAST Blue A | Milliken & Company, Spartanburg, SC, United States |
| MX257 | A diglycidyl ether of bisphenol A epoxy resin containing 37.5 wt. % butadiene-acrylic co-polymer core shell rubber having an approximate epoxy equivalent weight of 294 grams/equivalent, available under the trade designation KANE ACE MX257 | Kaneka Texas Corporation, Pasadena, TX, United States |
| MY721 | A multifunctional epoxy resin, available under the trade designation ARALDITE MY-721 | Huntsman Advanced Chemicals, Woodlands, TX, United States |
| R202 | Fumed silica, available under the trade designation AEROSIL R 202 | Evonik Industries AG |
| SF20 | Amorphous silica | 3M Company, St. Paul, MN, United States |
| T742 | Semi-solid multifunctional epoxy resin, available under the designation TACTIX 742 | Huntsman Corporation, The Woodlands, TX, United States |
| W9010 | Phosphoric acid ester wetting and dispersing additive, available under the designation BYK W 9010 | Altana AG, Wesel, Germany |

Test Methods

Grade 2024-T3 bare aluminum panels were obtained from Erickson Metals of Minnesota, Inc., Coon Rapids, Minnesota Prior to bonding with structural adhesive, the panels were subjected to the following panel preparation process.

Panel Preparation

A bare aluminum panel was soaked in OAKITE 165 (BASF Corporation) caustic wash solution for ten minutes at 85° C. (185° F.). The panel was then immersed in tap water for ten minutes at 21° C. (69.8° F.), followed by a continuous spray rinsing with tap water for approximately three minutes. The panel was then immersed in a Forest Products Laboratory (FPL) etch solution for ten minutes at 66° C. (151° F.), after which the panel was spray rinsed with water for approximately three minutes at 21° C. 69.8° F.), allowed to drip dry for another ten minutes, then dried in an oven for thirty minutes at 54° C. The etched panel was ready to bond with adhesive and it was used within 8-12 hours.

Floating Roller Peel (FRP) Strength Test

The methods of EN2243-2:2006 were followed. Etched panels of 2024-T3 bare aluminum measuring 20.3 cm×7.6 cm×0.16 cm (8.0 inches×3.0 inches×0.063 inches), and 25.4 cm×7.6 cm×0.064 cm (10 inches×3 inches×0.025 inch), were prepared for testing as described above under "Panel Preparation". An adhesive corresponding to the example or comparative example was applied onto etched panels of 2024-T3 bare aluminum measuring 20.3 cm×7.6 cm×0.16 cm. Primed 25.4 cm×7.6 cm×0.064 aluminum panel was then applied over a 20.3 cm×7.6 cm×0.16 cm panel on which the adhesive was already applied. The assembly was then pressed between metal blocks at an approximate pressure of 2-5 psi (13.8-34.5 KPa). The panel assembly was cured at ambient temperature for 72 hours, then evaluated for floating roller peel strength in accordance with ASTM D-3167-76 with the following modification. Three samples were tested for each example or comparative example and the average value (in N/25 mm) was reported. Test strips measuring 1.27 cm (0.5 inches) wide were cut along the lengthwise direction of the bonded aluminum panels. The test was conducted at a rate of 30.5 cm/minute (6 inches/minute) at ambient temperature. In each test, the thinner substrate was peeled from the thicker one, and the results normalized to a width of 25 mm (approximately 1 inch).

Compression Modulus Test

Cylindrical samples of 2.54 cm (1-inch) length and 1.27 cm (0.5-inch) diameter were prepared by injecting mixed product in a silicone mold. The samples were left to cure at room temperature for one week. Compression modulus tests were performed in accordance to the methods of ISO 604:2002 at test speed of 0.127 cm/min (0.05 inch/min) for each composition. Five specimens were tested for each composition and the average value was recorded. For testing at elevated temperature (i.e., 90° C.), the specimens were preconditioned at that temperature for at least fifteen minutes prior to testing.

Examples 1-4 (EX1-EX4) and Comparative Examples 1-2 (CE1-CE2)

Preparation of Part A

Part A of the epoxy-based curable compositions were prepared by combining in each case the main amine component (EC130 or 2422 or BAPP) with the epoxy resin E828 in glass vessels equipped with a lab stirrer. The mixture was mixed at ambient temperature for approximately fifteen minutes and then heated up to 80° C. (176° F.) by using an oil bath. The mixture was kept under stirring at 80° C. (176° F.) for sixty minutes. The mixture was then cooled to ambient temperature and transferred to a DAC 150 SPEED-MIXER (obtained from Hauschild & Co. KG of Hamm Westphalia, Germany). ATBN and K54 were added to the mixture and mixed for one min at 2000 rpm. SF20, A140, R202 and Blue were then added and mixed for two minutes at 3500 rpm. The composition was then degassed for two minutes under vacuum while mixing. In Table 2, all concentrations are given as weight percent.

TABLE 2

Part A Compositions (Weight Percent)

| | EX1 | EX2 | EX3 | EX4 | CE1 | CE2 |
|---|---|---|---|---|---|---|
| EC130 | 38 | 38 | 20 | 38 | 0 | 0 |
| 2422 | 0 | 0 | 18 | 0 | 38 | 0 |
| BAPP | 0 | 0 | 0 | 0 | 0 | 38 |
| E828 | 10 | 10 | 10 | 10 | 10 | 10 |
| ATBN | 20 | 0 | 20 | 20 | 20 | 20 |
| 2650J | 0 | 20 | 0 | 0 | 0 | 0 |
| K54 | 5 | 5 | 5 | 5 | 5 | 5 |
| SF20 | 24.95 | 24.95 | 24.95 | 24.95 | 24.95 | 24.95 |
| A140 | 1 | 1 | 1 | 1 | 1 | 1 |
| R202 | 1 | 1 | 1 | 1 | 1 | 1 |
| Blue | 0.05 | 0.05 | 0.05 | 0.05 | 0.05 | 0.05 |

Preparation of Part B

Part B of the epoxy-based curable compositions were prepared by combining in each case the compounds listed in Table 3 in a DAC 150 SPEEDMIXER at ambient temperature. In a first step, the epoxy resin components and wetting agents were mixed at 3000 rpm for two minutes. The solid components were then added and mixed at 3500 rpm for two minutes. The mixture was then degassed for two minutes by mixing at 2000 rpm under vacuum. In Table 3, all concentrations are given as weight percent.

TABLE 3

Part B Compositions (Weight Percent)

| | EX1 | EX2 | EX3 | EX4 | CE1 | CE2 |
|---|---|---|---|---|---|---|
| MX257 | 14.45 | 14.45 | 14.45 | 14.45 | 14.45 | 14.45 |
| T742 | 30 | 30 | 30 | 0 | 30 | 30 |
| MY721 | 17 | 17 | 17 | 0 | 17 | 17 |
| D.E.N. 431 | 9 | 9 | 9 | 56 | 9 | 9 |
| E1510 | 3 | 3 | 3 | 3 | 3 | 3 |
| E757 | 1.5 | 1.5 | 1.5 | 1.5 | 1.5 | 1.5 |
| GLYEO | 1.5 | 1.5 | 1.5 | 1.5 | 1.5 | 1.5 |
| W9010 | 0.5 | 0.5 | 0.5 | 0.5 | 0.5 | 0.5 |
| SF20 | 21 | 21 | 21 | 21 | 21 | 21 |
| R202 | 2 | 2 | 2 | 2 | 2 | 2 |
| C-Yellow | 0.05 | 0.05 | 0.05 | 0.05 | 0.05 | 0.05 |

Mixing of Part A and Part B

Part A and Part B compositions were mixed together in a 2:1 ratio (Part B:Part A) by volume using a 200 ml cartridge with a static Quadro MFQ 10-24T Mixer obtained from Sulzer Mixpac of Winterthur, Switzerland at ambient temperature.

Testing

Compression Modulus and FRP testing were conducted. The conditions and the results of the testing are represented in Table 4.

Comparative Example 3 (CE3)

A sample of LOCTITE EA 9394 AERO adhesive obtained from Henkel Corporation of Düsseldorf, Germany underwent Compression Modulus and FRP testing. Results are represented in Table 4.

TABLE 4

Test Results

| Example | Compression Modulus MPa (psi) | FRP N/25 mm |
|---|---|---|
| EX1 | 1000 (1.43E5) | 125 |
| EX2 | 1100 (1.57E5) | 130 |
| EX3 | 1200 (1.71E5) | 30 |
| EX4 | 440 (6.29E4) | 175 |
| CE1 | 1500 (2.14E5) | 0 |
| CE2 | 1350 (1.93E5) | 0 |
| CE3 | 1500 (2.14E5) | 0 |

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A two-part curable shimming adhesive comprising:
a base part comprising:
a multifunctional epoxy resin blend comprising a trifunctional epoxy resin and a tetrafunctional epoxy resin present in a relative weight ratio of from 1:1 to 8:1; and
a difunctional epoxy resin miscibly blended with the multifunctional epoxy resin blend;
wherein the multifunctional epoxy resin blend and the difunctional epoxy resin are present in a weight ratio of from 1:1 to 6:1; and
a hardener part comprising:
a polyetheramine present in an amount of from 5 percent to 30 percent, relative to the overall weight of the two-part curable shimming adhesive;
wherein at least one of the base part and the hardener part further comprises an inorganic filler material, which comprises at least one inorganic filler, and a phosphoric acid ester; the inorganic filler material is present in an amount from 10 percent to 60 percent, relative to the overall weight of the two-part curable shimming adhesive, and the inorganic filler material and the phosphoric acid ester are present in a relative weight ratio of from 100:3 to 1000:3;
wherein at least one of the base part and the hardener part further comprises core-shell rubber particles; and
wherein the inorganic filler material comprises fumed silica.

2. The two-part curable shimming adhesive of claim 1, wherein the core-shell rubber particles are present in an amount of from 1 percent to 20 percent, relative to the overall weight of the two-part curable shimming adhesive.

3. The two-part curable shimming adhesive of claim 1, wherein the trifunctional epoxy resin is triphenyl methane triglycidyl ether.

4. The two-part curable shimming adhesive of claim 1, wherein the tetrafunctional epoxy resin is 4,4'-methylenebis (N,N-diglycidylaniline).

5. The two-part curable shimming adhesive of claim 1, wherein the polyetheramine is 4,7,10-trioxatridecane 1,13-diamine.

6. The two-part curable shimming adhesive of claim 1, wherein the polyetheramine is present in an amount of from 10 percent to 30 percent, relative to the overall weight of the two-part curable shimming adhesive.

7. The two-part curable shimming adhesive of claim 1, wherein the phosphoric acid ester is a phosphoric acid polyester containing acid groups.

8. A bonded assembly comprising a reaction product of the two-part curable shimming adhesive of claim 1, the reaction product disposed between bonding surfaces of two or more respective substrates.

* * * * *